United States Patent Office 3,694,239
Patented Sept. 26, 1972

3,694,239
METHOD OF GRINDING PIGMENT
Martin J. Simon, Natrona Heights, Pa., assignor to
PPG Industries, Inc., Pittsburgh, Pa.
No Drawing. Filed Jan. 5, 1971, Ser. No. 104,135
Int. Cl. C09c 1/56, 1/36
U.S. Cl. 106—309
7 Claims

ABSTRACT OF THE DISCLOSURE

Pigments are dispersed in a dispersant comprising a solvent solution of methyl 12-hydroxystearate. The pigments are ground in the dispersant and used to pigment coating compositions.

---

In the formation of paint compositions an important factor is the introduction of the pigments to the coating composition. Pigments are ground in a dispersing agent and then inserted into the coating composition to give the coating composition the proper color, opacity and consistency. The time required for grinding some pigments and dispersing of the pigment in the coating composition poses a problem for many paint compositions.

It has now been discovered that paint compositions may be pigmented to achieve paint films having good metallic orientation, reproducible color and opacity with fast grinding times by grinding the pigment in a dispersant comprising a solvent solution of methyl 12-hydroxystearate. The use of this dispersant greatly reduces the grinding time necessary to disperse the pigment and aids in the metallic orientation of the resulting pigment composition.

The novel grinding dispersant comprises a solvent solution of methyl 12-hydroxystearate.

The solvent may be any solvent which dissolves methyl 12-hydroxystearate and as such the particular solvent or solvent system used is not critical. Solvents which are preferred are toluene, methyl ethyl ketone, naphtha and aliphatic hydrocarbons such as hexane, heptane and the like. The methyl 12-hydroxystearate generally comprises from about 2 to about 40 percent by weight of the grinding dispersant.

The dispersant may also, if desired, contain other materials such as plasticizers and the like, but the preferred dispersant contains only the solution of methyl 12-hydroxystearate.

Any of the conventional pigments may be dispersed in the above described dispersants and ground therein and then be inserted into a coating composition to form a paint. The preferred pigments are those conventionally used such as carbon black, cadmium red, light brunswick green, monolite yellow, red oxide, venetian red, yellow oxide, gainaeridone red, phthalo blue, titanium dioxide, aluminum powder and others. The pigment and dispersant may be ground in the conventional manner such as in a steel ball mill, pebble mill or attritor.

The pigment to dispersant ratios vary from pigment to pigment and thus a wide range of proportions from 2 to 98 percent by weight dispersant may be used. However, in the preferred embodiment the pigment will comprise from about 20 percent to about 90 percent by weight of the blend of pigment and dispersant.

One of the advantages of the dispersing method of this invention is that a variety of coating compositions may be pigmented with the pigment paste without compatability problems. Thus thermoplastic and thermosetting coatings may be pigmented with the pigment pastes. The method is particularly desirable to pigment non-aqueous acrylic polymer dispersion coatings as these coatings are difficult to satisfactorily pigment.

Coating compositions utilizing the pigment pastes formed by the method of ths invention can be applied to many substrates such as glass, wood, cardboard, plastics and metals such as steel, aluminum and others. As the pigment pastes of this invention give excellent metallic orientation in coatings the pigmented coatings are especially useful as finishes for automobiles and other vehicles.

The following examples set forth specific embodiments of the instant invention. However, the invention is not to be construed as being limited to these embodiments for there are of course numerous possible variations and modifications. All parts and percentages in the examples as well as throughout the specification are by weight unless otherwise indicated.

EXAMPLE 1

A white pigment paste was prepared by charging 54 grams of titanium dioxide, 6 grams of methyl 12-hydroxystearate, 16 grams of toluene, 13 grams of VM&P naphtha, 8 grams of ethylene glycol mono butyl ether acetate (Cellosolve acetate) and 3 grams of ethylene glycol diacetate into a pebble mill.

A good white pigment paste was developed by grinding for 16 to 20 hours.

EXAMPLE 2

A phthalo blue pigment paste was prepared by charging 16.6 grams of phthalo blue pigment, 25 grams of methyl 12-hydroxystearate, 29.2 grams of methyl ethyl ketone and 29.2 grams of VM&P naphtha into a jiffy mill.

After only one-half hour of grinding in the jiffy mill, a good blue pigment paste was produced.

EXAMPLE 3

A medium blue metallic pigment paste was prepared as follows:

40 parts of aluminum powder were mixed with 11.5 parts of methyl 12-hydroxystearate, 24.5 parts of methyl ethyl ketone and 24 parts of VM&P naphtha. This blend was stirred with mild agitation.

To 100 parts of the aluminum paste prepared above were added 80.2 parts of a phthalo blue paste prepared by grinding 16.6 grams of phthalo blue pigment, 25 grams of methyl 12-hydroxystearate, 29.2 grams of methyl ethyl ketone and 29.2 grams of VM&P naphtha.

The mixed pigment paste produced a good color and gloss in both thermosetting and thermoplastic acrylic coatings.

EXAMPLE 4

A black pigment paste was prepared by charging a vessel with 13.8 grams of carbon black pigment, 25 grams of methyl 12-hydroxystearate and 61.2 grams of methyl ethyl ketone and grinding in a steel ball mill.

A thermoplastic acrylic lacquer was formulated using this paste and exhibited excellent jet color and gloss.

According to the provisions of the patent statutes, there are described above the invention and what are now considered to be its best embodiments. However, within the scope of the appended claims, it is to be understood that the invention can be practiced otherwise than as specifically described.

I claim:
1. The method of grinding pigment for incorporation into paint compositions comprising adding pigment material to a pigment dispersant comprising a solvent solution of methyl 12-hydroxystearate and grinding said pigment in said pigment dispersant to form a pigment paste.
2. The method of claim 1 wherein the pigment is carbon black.
3. The method of claim 1 wherein the solvent is toluene.

4. The method of claim 1 wherein the solvent is methyl ethyl ketone.

5. The method of claim 1 wherein the solvent is an aliphatic hydrocarbon.

6. The method of claim 1 wherein the dispersant comprises from about 2 percent to about 40 percent by weight of methyl 12-hydroxystearate.

7. The method of claim 1 wherein the dispersant comprises from about 20 percent to about 90 percent by weight of the blend of pigment and dispersant.

References Cited
UNITED STATES PATENTS

| | | | |
|---|---|---|---|
| 3,577,254 | 5/1971 | Petke | 106—308 Q |
| 3,546,150 | 12/1970 | White et al. | 260—28.5 |

TOBIAS E. LEVOW, Primary Examiner

J. V. HOWARD, Assistant Examiner

U.S. Cl. X.R.

106—308 F, 307, 300